United States Patent
Raindel et al.

(10) Patent No.: US 10,715,451 B2
(45) Date of Patent: *Jul. 14, 2020

(54) EFFICIENT TRANSPORT FLOW PROCESSING ON AN ACCELERATOR

(71) Applicant: Mellanox Technologies Ltd., Yokneam (IL)

(72) Inventors: Shachar Raindel, Haifa (IL); Shlomo Raikin, Kibbutz Yassur (IL); Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,013

(22) Filed: May 4, 2016

(65) Prior Publication Data

US 2016/0330301 A1 Nov. 10, 2016

Related U.S. Application Data

(60) Provisional application No. 62/163,995, filed on May 20, 2015.

(30) Foreign Application Priority Data

May 7, 2015 (IL) .......................... 238690

(51) Int. Cl.
*H04L 12/801* (2013.01)
*H04L 29/08* (2006.01)
(Continued)

(52) U.S. Cl.
CPC .......... *H04L 47/193* (2013.01); *G06F 21/602* (2013.01); *H04L 47/2441* (2013.01);
(Continued)

(58) Field of Classification Search
CPC ............... H04L 67/327; H04L 63/0428; H04L 63/0485; H04L 47/2441; H04L 63/04; H04L 69/22; H04L 47/193; G06F 21/602
See application file for complete search history.

(56) References Cited

U.S. PATENT DOCUMENTS 6,901,496 B1 5/2005 Mukund et al.
7,657,659 B1 2/2010 Lambeth et al.
(Continued)

FOREIGN PATENT DOCUMENTS

EP 1657878 A1 5/2006
EP 2463782 A2 6/2012
WO 2010062679 6/2010

OTHER PUBLICATIONS

PCI Express® Base Specification, Revision 3.1, 1073 pages, Mar. 2014.

(Continued)

*Primary Examiner* — Mandish K Randhawa
(74) *Attorney, Agent, or Firm* — Kligler & Associates Patent Attorneys Ltd

(57) ABSTRACT

Data processing apparatus includes a host processor and a network interface controller (NIC), which is configured to couple the host processor to a packet data network. A memory holds a flow state table containing context information with respect to computational operations to be performed on multiple packet flows conveyed between the host processor and the network. Acceleration logic is coupled to perform the computational operations on payloads of packets in the multiple packet flows using the context information in the flow state table.

22 Claims, 7 Drawing Sheets

(51) Int. Cl.
  *H04L 29/06* (2006.01)
  *G06F 21/60* (2013.01)
  *H04L 12/851* (2013.01)
(52) U.S. Cl.
  CPC .......... *H04L 63/04* (2013.01); *H04L 63/0428* (2013.01); *H04L 63/0485* (2013.01); *H04L 67/327* (2013.01); *H04L 69/22* (2013.01)

(56) References Cited

U.S. PATENT DOCUMENTS

| | | | |
|---|---|---|---|
| 8,006,297 | B2 | 8/2011 | Johnson et al. |
| 8,103,785 | B2 | 1/2012 | Crowley et al. |
| 8,824,492 | B2 | 9/2014 | Wang et al. |
| 9,904,568 | B2 | 2/2018 | Vincent et al. |
| 10,423,774 | B1 | 4/2019 | Zelenov et al. |
| 2003/0023846 | A1 | 1/2003 | Krishna et al. |
| 2004/0039940 | A1 | 2/2004 | Cox et al. |
| 2004/0057434 | A1 | 3/2004 | Poon et al. |
| 2004/0158710 | A1* | 8/2004 | Buer .................. H04L 63/0485 713/160 |
| 2005/0102497 | A1* | 5/2005 | Buer .................. G06F 11/2038 713/150 |
| 2005/0198412 | A1 | 9/2005 | Pedersen et al. |
| 2006/0095754 | A1 | 5/2006 | Hyder et al. |
| 2006/0104308 | A1 | 5/2006 | Pinkerton et al. |
| 2009/0086736 | A1 | 4/2009 | Foong et al. |
| 2009/0319775 | A1 | 12/2009 | Buer et al. |
| 2009/0328170 | A1 | 12/2009 | Williams et al. |
| 2010/0228962 | A1 | 9/2010 | Simon et al. |
| 2012/0314709 | A1* | 12/2012 | Post .................. G06F 12/0802 370/392 |
| 2013/0080651 | A1* | 3/2013 | Pope .................. H04L 69/161 709/231 |
| 2013/0125125 | A1 | 5/2013 | Karino et al. |
| 2013/0142205 | A1 | 6/2013 | Munoz |
| 2013/0263247 | A1 | 10/2013 | Jungck et al. |
| 2013/0276133 | A1 | 10/2013 | Hodges et al. |
| 2013/0329557 | A1* | 12/2013 | Petry .................. H04L 63/0272 370/235 |
| 2013/0347110 | A1 | 12/2013 | Dalal |
| 2014/0254593 | A1 | 9/2014 | Mital et al. |
| 2014/0282050 | A1 | 9/2014 | Quinn et al. |
| 2015/0100962 | A1 | 4/2015 | Morita et al. |
| 2015/0347185 | A1 | 12/2015 | Holt et al. |
| 2015/0355938 | A1 | 12/2015 | Jokinen et al. |
| 2016/0132329 | A1 | 5/2016 | Gupte et al. |
| 2016/0226822 | A1 | 8/2016 | Zhang et al. |
| 2016/0342547 | A1 | 11/2016 | Liss et al. |
| 2016/0350151 | A1 | 12/2016 | Zou et al. |
| 2016/0378529 | A1 | 12/2016 | Wen |
| 2017/0180273 | A1 | 6/2017 | Daly et al. |
| 2017/0237672 | A1 | 8/2017 | Dalal |
| 2017/0264622 | A1 | 9/2017 | Cooper et al. |
| 2017/0286157 | A1 | 10/2017 | Hasting et al. |
| 2018/0004954 | A1 | 1/2018 | Liguori et al. |
| 2018/0109471 | A1 | 4/2018 | Chang et al. |
| 2018/0114013 | A1 | 4/2018 | Sood et al. |
| 2018/0210751 | A1 | 7/2018 | Pepus et al. |
| 2018/0219770 | A1 | 8/2018 | Wu et al. |
| 2018/0219772 | A1 | 8/2018 | Koster et al. |
| 2018/0262468 | A1 | 9/2018 | Kumar et al. |
| 2018/0285288 | A1 | 10/2018 | Bernat et al. |
| 2018/0329828 | A1 | 11/2018 | Apfelbaum et al. |
| 2019/0012350 | A1 | 1/2019 | Sindhu et al. |
| 2019/0173846 | A1 | 6/2019 | Patterson et al. |
| 2019/0250938 | A1 | 8/2019 | Claes et al. |

OTHER PUBLICATIONS

Shirey., "Internet Security Glossary, Version 2", Request for Comments: 4949, 365 pages, Aug. 2007.
Request for Comments 793, "Transmission Control Protocol", Darpa Internet Program Protocol Specification, Information Sciences Institute, 90 pages, Sep. 1981.
Raindel et al., U.S. Appl. No. 15/145,983, filed May 4, 2016.
Liss et al., U.S. Appl. No. 15/154,945, filed May 14, 2016.
Netronome Systems, Inc., "Open vSwitch Offload and Acceleration with Agilio® CX SmartNICs", White Paper, 7 pages, Mar. 2017.
Stevens., "TCP Slow Start, Congestion Avoidance, Fast Retransmit, and Fast Recovery Algorithms", Request for Comments 2001, 6 pages, Jan. 1997.
U.S. Appl. No. 15/145,983 office action dated Mar. 7, 2018.
U.S. Appl. No. 15/154,945 office action dated Apr. 5, 2018.
International Application # PCT/IB2018/058705 search report dated Feb. 18, 2019.
International Application # PCT/IB2018/059824 search report dated Mar. 22, 2019.
U.S. Appl. No. 15/701,459 office action dated Dec. 27, 2018.
U.S. Appl. No. 16/012,826 office action dated Oct. 1, 2019.
U.S. Appl. No. 16/202,132 office action dated Apr. 2, 2020.

* cited by examiner

| Flow Identifier | Encryption key | Expected Sequence Number | Encryption State | Out of order |
|---|---|---|---|---|
| src_ip=1.2.3.4, dst_ip=5.6.7.8, src_port=1040, dst_port=443 | 0xabcdef012... | 10232 | Last_block = 0x1234567... SHA-1 state = 0x89abcdef... | N |
| src_ip=9.10.11.12, dst_ip=5.6.7.8, src_port=1240, dst_port=443 | 0x245623... | 15231 | Last_block = 0x124121... SHA-1 state = 0x354312... | N |
| ... | ... | ... | ... | Y |

EFFICIENT TRANSPORT FLOW PROCESSING ON AN ACCELERATOR

CROSS-REFERENCE TO RELATED APPLICATION

This application claims the benefit of U.S. Provisional Patent Application 62/163,995, filed May 20, 2015, which is incorporated herein by reference.

FIELD OF THE INVENTION

The present invention relates generally to computer systems, and particularly to computational accelerator devices and methods.

BACKGROUND

Because cryptographic operations are computation-intensive, some computers offload these operations to a dedicated co-processor. For example, Intel® Corporation (San Jose, Calif.) offers the Cave Creek chip set for use with its Xeon® processors. The Cave Creek chips include hardware accelerators for cryptography, compression and pattern matching.

Some network cryptographic solutions use a "bump-in-the-wire approach." This term is defined in Request for Comments (RFC) 4949 of the Internet Engineering Task Force (IETF) as an implementation approach that places a network security mechanism outside of the system that is to be protected. For example, IPsec, a standard security architecture for the Internet Protocol (IP), can be implemented outboard, in a physically separate device, so that the system that receives the IPsec protection does not need to be modified. Military-grade link encryption is also sometimes implemented in bump-in-the-wire devices.

SUMMARY

Embodiments of the present invention that are described hereinbelow provide improved devices and methods for computational acceleration in a computer system.

There is therefore provided, in accordance with an embodiment of the invention, a data processing device, including a first packet communication interface for communication with at least one host processor via a network interface controller (NIC), and a second packet communication interface for communication with a packet data network. A memory is configured to hold a flow state table containing context information with respect to multiple packet flows conveyed between the host processor and the network via the first and second interfaces packet communication interfaces. Acceleration logic is coupled between the first and second packet communication interfaces and is configured to perform computational operations on payloads of packets in the multiple packet flows using the context information in the flow state table.

In some embodiments, the first and second packet communication interfaces include Ethernet interfaces.

In the disclosed embodiments, the multiple packet flows include first packets conveyed by the NIC to the device through the first packet communication interface for transmission to the packet data network and second packets conveyed from the packet data network to the device through the second packet communication interface for delivery to the NIC, and the acceleration logic is configured to perform the computational operations on both the first and the second packets before passing the first and the second packets to the second and the first packet communication interfaces, respectively.

In some embodiments, the computational operations performed by the acceleration logic include cryptographic computations, and the context information includes cryptographic parameters, such as a respective encryption key and encryption state for each of the packet flows.

In the disclosed embodiments, the multiple packet flows include transport-layer flows, and the context information includes multiple flow table entries that are respectively keyed to the transport-layer flows. In some embodiments, the transport-layer flows include sequences of the packets that are transmitted in accordance with the Transmission Control Protocol (TCP), and the flow table entries contain TCP header information. Additionally or alternatively, the acceleration logic is configured to store the entries in the flow state table in response to table update instructions conveyed by the host processor to the acceleration logic via the first packet communication interface.

In some embodiments, the acceleration logic is configured to check the data packets against a predefined condition, and to pass a packet through between the packet communication interfaces without performing the computational operations on a payload of the packet when the packet does not satisfy the predefined condition. In one embodiment, the predefined condition is that the flow state table contain an entry corresponding to a flow to which the packet belongs. Alternatively or additionally, the predefined condition, when the packet is received by the acceleration logic through the first packet communication interface, is that the packet is conveyed from the NIC with a mark indicating that handling of the packet by the acceleration logic is needed.

Further additionally or alternatively, the predefined condition is that the packet have a sequence number that matches an expected sequence number that is recorded in the flow state table for a flow to which the packet belongs. In a disclosed embodiment, the acceleration logic is configured, upon receiving in a given flow, through the second packet communication interface, the packet having the sequence number that does not match the expected sequence number, to mark the given flow as an out-of-order flow in the flow state table and to convey the packet through the first packet communication interface along with a notification that the given flow is out of order. Typically, the acceleration logic is configured, after conveying the notification that the given flow is out of order, to receive from the at least one host processor an update to the flow state table with respect to the given flow, and following the update, to resume performing the computational operations on the packets in the given flow.

In another embodiment, the acceleration logic is configured, after passing a given packet received from the second packet communication interface through to the first packet communication interface without performing the computational operations, to receive, via the first packet communication interface, a replay instruction with respect to the given packet, and in response to the replay instruction, to perform the computational operations on a payload of the given packet and to pass the payload, following performance of the computational operations, to the NIC via the first packet communication interface.

In a disclosed embodiment, the first packet communication interface is configured to be coupled to communicate with multiple host processors, including at least first and second host processors, wherein the flow state table contains context information with respect to at least first and second packet flows conveyed via the device to and from the first and second host processors, respectively.

There is also provided, in accordance with an embodiment of the invention, data processing apparatus, including a host processor and a network interface controller (NIC), which is configured to couple the host processor to a packet data network. A memory is configured to hold a flow state table containing context information with respect to computational operations to be performed on multiple packet flows conveyed between the host processor and the network. Acceleration logic is coupled to perform the computational operations on payloads of packets in the multiple packet flows using the context information in the flow state table.

In some embodiments, the acceleration logic and the memory are included in an acceleration device, which is coupled between the NIC and the packet data network. In one such embodiment, the apparatus includes a switch, which is coupled between the NIC and the acceleration device and is configured to be coupled to communicate with multiple host processors, wherein the flow state table contains context information with respect to the packet flows conveyed via the acceleration device to and from the multiple host processors.

In other embodiments, the acceleration logic is coupled to the host processor and the NIC via a host bus, and the NIC is configured to steer the packets received from the packet data network in the multiple packet flows via the host bus to the acceleration logic for performance of the computation operations thereon. In a disclosed embodiment, the acceleration logic is configured to pass copies of the steered packets to the host processor for transport-layer processing of headers of the packets, while replacing the payloads of the copies of the steered packets with descriptors indicating respective locations of the payloads in the memory, and the host processor is configured to issue instructions to the acceleration logic using the descriptors.

In some embodiments, at least one of the host processor and the NIC is configured to apply tags to the packets for transmission to the packet data network, wherein the tags are indicative of the computational operations to be performed by the acceleration logic, and wherein the acceleration logic is configured to decide on the computational operations to be applied to each of the packets that it receives from the NIC responsively to the tags.

There is additionally provided, in accordance with an embodiment of the invention, a method for data processing, which includes receiving in a computational accelerator, which is coupled via a first packet communication interface to communicate with at least one host processor via a network interface controller (NIC) and via a second packet communication interface to communication with a packet data network, a flow of data packets through one of the first and second interfaces for conveyance to the other of the first and second packet communication interfaces. The computational accelerator looks up context information with respect to the flow in a flow state table, which contains respective context entries with respect to multiple packet flows conveyed between the host processor and the network. The computational accelerator performs a predefined computational operation on a payload of a data packet in the flow using the context information, and after performing the predefined computational operation, transmits the data packet through the other of the first and second packet communication interfaces.

There is further provided, in accordance with an embodiment of the invention, a method for data processing, which includes coupling a computational accelerator to communicate with a host processor, which is coupled to transmit and receive data packets to and from a packet data network. A flow state table, stored in a memory, contains context information with respect to computational operations to be performed by the computational accelerator on multiple packet flows conveyed between the host processor and the packet data network. The computational operations are performed in the computational accelerator on payloads of packets in the multiple packet flows using the context information in the flow state table.

The present invention will be more fully understood from the following detailed description of the embodiments thereof, taken together with the drawings in which:

DETAILED DESCRIPTION OF EMBODIMENTS

Overview

Figure 1:
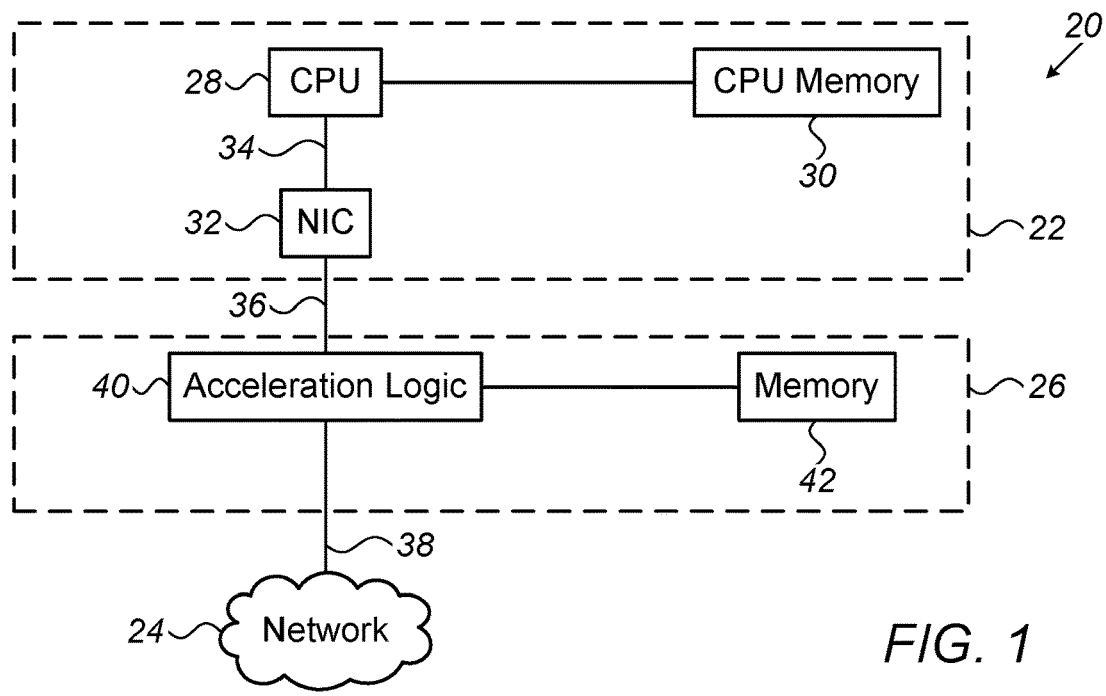
FIG. 1 is block diagram that schematically illustrates a computer system with a cryptographic accelerator, in accordance with an embodiment of the invention.

Bump-in-the-wire devices are deployed on a data communication link between a network and the host computer or system that the device is intended to serve. In this configuration, a bump-in-the-wire computational accelerator, such as a cryptographic accelerator, is required to implement not only its intended computational function, but also packet header processing and communication protocol logic. For stateless link-layer and network-layer protocols, such as Ethernet and IP, this logical burden is manageable. Connection-oriented transport protocols, such as the Transmission Control Protocol (TCP), however, are much more complex. Although hardware implementations of TCP processing functions are known in the art, they are costly in terms of chip "real estate" and limited in the number of flows they can support.

As a result of these issues, bump-in-the-wire computational accelerators that are known in the art are limited in their usefulness and scalability when connection-oriented transport-layer traffic is involved. Consequently, cryptographic operations involved in session encryption solutions, such as the Secure Sockets Layer (SSL) and Transport Layer Security (TLS), are generally performed in software on the host central processing unit (CPU), rather than offloaded to a hardware accelerator.

In contrast to such approaches, embodiments of the present invention enable leveraging bump-in-the-wire accelerator logic to offload cryptographic primitives from the host processor. This functionality is achieved while keeping the implementation of the transport logic on the host processor. The disclosed solutions perform the cryptographic operations upon receiving encrypted data from the network and/or during the transmission of packets that are to contain encrypted data to the network.

In the disclosed embodiments, a bump-in-the-wire accelerator device (referred to hereinafter simply as an accelerator) performs opportunistic decryption of received data when the packets carrying the data are received in order, without any packet loss. The accelerator logic decrypts the contents of these packets using computational context information, including cryptographic variables, from a table in local memory, and updating the table as required.

This sort of table is referred to herein as a "flow state table." The table contains an entry for each flow that the host processor chooses to pass to the accelerator for processing, wherein each flow corresponds, for example, to a respective TCP connection, and the accelerator handles multiple flows in parallel on the fly. The number of flows that the accelerator can handle in this matter is limited only by the speed of the accelerator logic and the size of the flow state table.

When the accelerator detects a loss or reordering of the packets in a given flow, however, it does not immediately decrypt the packet. Rather, the current offload state of the flow is transmitted to the host processor along with the received packets, allowing the host processor to recover the connection. The state information can be passed to the host processor as a special packet. The host processor resumes the decryption and/or authentication flow in software, from the point indicated by the state information, after rearranging the packets as necessary. Once the rearranged packets are decrypted, the host processor can send a request to update the state information in the flow state table, thus enabling the accelerator to resume its hardware-based processing of the packets in the flow at a point indicated by the host processor.

For transmission, each packet or group of packets is sent from the host to the accelerator with extra information describing what cryptographic handling is needed, including all relevant cryptographic state variables. The accelerator performs cryptographic signature and/or encryption functions as needed, using the information in the flow state table. To support retransmission when needed, depending upon the specifics of the cipher suite being used, the accelerator can also pass information back to the host regarding the packets that it processes. For example, the accelerator can pass an entire copy of each packet that it sends, and the host will keep this copy in memory for retransmission until an acknowledgement is received.

The hardware architecture and data flows for packet reception and transmission that are described herein allow the host processor to offload cryptographic functions to an external accelerator, without requiring any transport layer implementation or data buffering in the accelerator, and without requiring synchronization with any hardware beyond the network interface controller (NIC) of the host to which the accelerator is connected. As long as packets are received in order, the accelerator relieves the host entirely of the burden of cryptographic computations, while reverting to host software handling when transport protocol irregularities are encountered.

In the embodiments that are described hereinbelow, the accelerator processes both incoming traffic from the network to the host computer and outgoing traffic from the host computer to the network. It is possible, however, to use just one side of the disclosed embodiments, so that, for example, the accelerator decrypts incoming data, but does not perform encryption of outgoing data.

Although the disclosed embodiments relate mainly to cryptographic operations, the principles of the present invention may similarly be applied in other sorts of computations, such as data compression and decompression and pattern matching.

System Description

FIG. 1 is block diagram that schematically illustrates a computer system 20 with a cryptographic accelerator 26, in accordance with an embodiment of the invention. System 20 comprises a host computer 22, which is connected to a packet data network 24, via accelerator 26 in a bump-in-the-wire configuration. Computer 22 comprises a CPU 28 with a main memory 30, which are connected to a NIC 32 by a suitable bus 34, such as a PCI Express® (PCIe®) bus. In the present example, network 24 is assumed to be an Ethernet network, operating in accordance with the IEEE 802.3 family of standards, although the principles of the present invention are similarly applicable, mutatis mutandis, to networks of other types. NIC 32 is connected to accelerator 26 by a network link 36, while accelerator 26 is connected to network 24 by another network link 38, both of them Ethernet links in this example and carrying TCP/IP traffic to and from network 24.

Accelerator 26 is a device comprising hardware acceleration logic 40 and a local memory 42, such as a random-access memory (RAM). These elements are typically implemented in an integrated circuit chip or chip set. It is desirable that the chip or chip set be designed with sufficient bandwidth to operate at the wire speed of NIC 32, so that the accelerator is required to perform only minimal data buffering and adds only minimal latency to the flow of packets between computer 22 and network 24. Details of the structure and functionality of the components of accelerator 26 are described with reference to the figures that follow.

Figure 2:
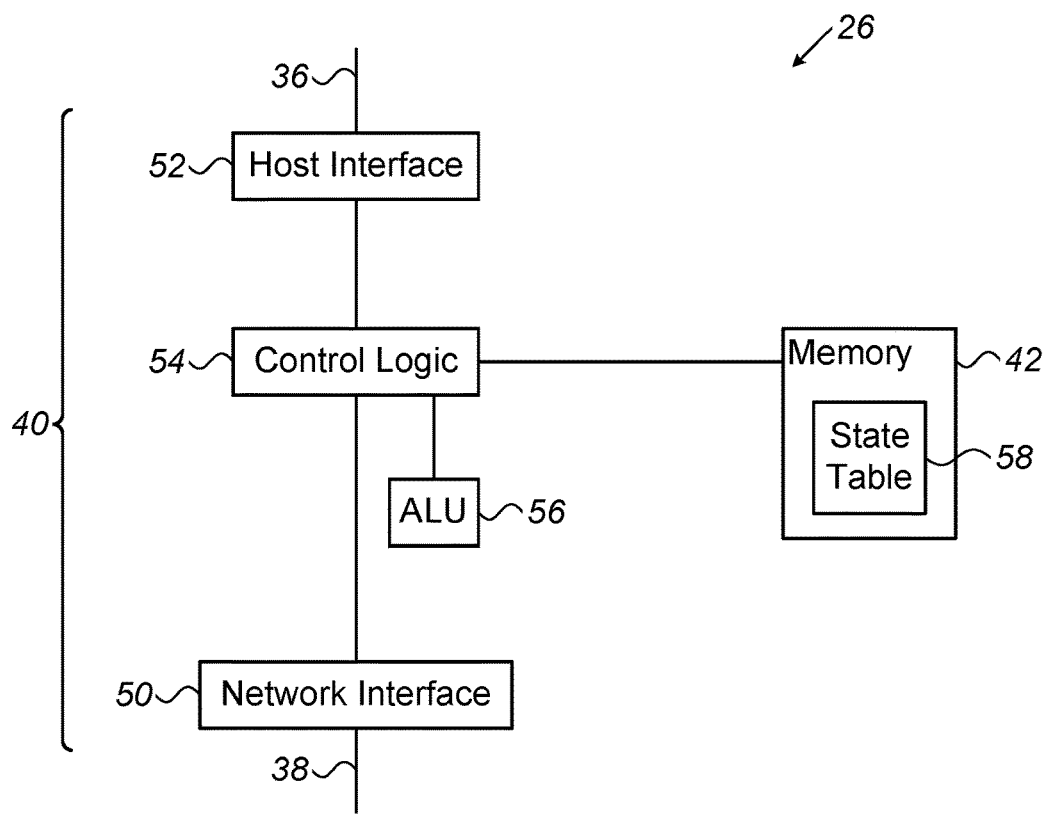
FIG. 2 is a block diagram that schematically shows details of a cryptographic accelerator, in accordance with an embodiment of the invention.

FIG. 2 is a block diagram that schematically shows details of cryptographic accelerator 26, in accordance with an embodiment of the invention. Hardware acceleration logic 40 comprises network interfaces 50 and 52, such as Ethernet ports in the present example, which are connected respectively to links 38 and 36. Interface 50 thus communicates with network 24, while interface 52 communicates with host CPU 28 via NIC 32. Acceleration logic 40 comprises control logic 54, which is responsible for packet handling and data transfer within accelerator 26, and an arithmetic logic unit (ALU) 56, which performs cryptographic computational operations on payloads of packets received through interfaces 50 and 52. These operations typically including encryption and decryption of messages and/or computation and verification of digital signatures, based on repeated multiplication and summation steps using cryptographic keys, in accordance with predefined cryptographic algorithms. Circuitry that can be used in implementing such steps is known in the art and is beyond the scope of the present description.

Figures 3, 4:
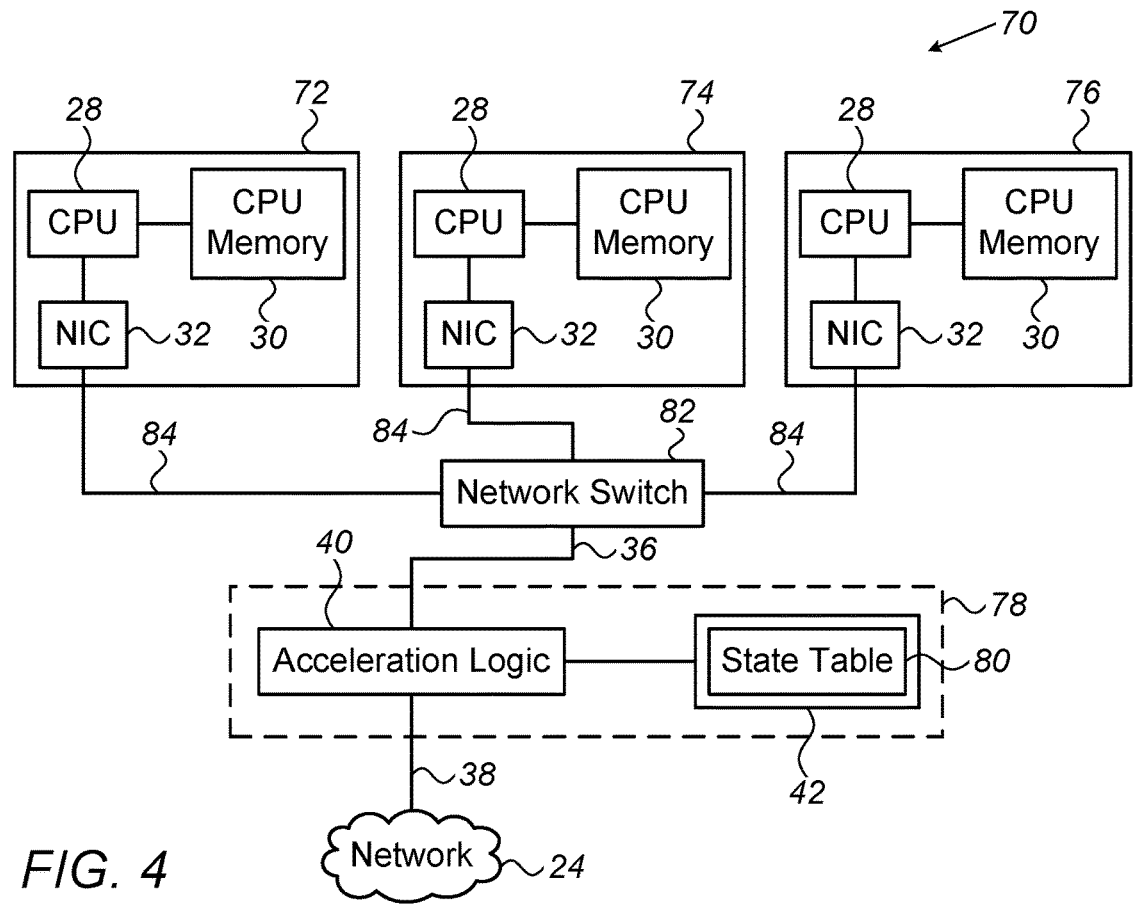
FIG. 3 is a schematic representation of a flow state table, in accordance with an embodiment of the invention.
FIG. 4 is block diagram that schematically illustrates a computer system with a cryptographic accelerator, in accordance with another embodiment of the invention.

Memory 42 holds a flow state table 58, containing computational context information with respect to packet flows conveyed between host computer 22 and network 24 via interfaces 52 and 50. An example table of this sort is shown in FIG. 3. Control logic 54 processes packets in multiple packet flows, using the context information in flow state table 58, and thus decides which packet payloads should be passed to ALU 56 for cryptographic processing and which should be passed through to CPU or handled in other ways. Example processes for packet handling by logic 40 are described hereinbelow with references to FIGS. 5-8.

FIG. 3 is a schematic representation of an example of flow state table 58, in accordance with an embodiment of the invention. Table 58 contains multiple entries 60, each corresponding to a packet flow, which is keyed by a flow identifier 62. For TCP/IP flows, for example, flow identifier 62 may comprise the packet 5-tuple (source and destination IP addresses and ports, along with the transport protocol) that identifies the TCP connection. Entries 60 are originally posted in table 58 by CPU 28 upon initiation of the corresponding flow, and then are updated by control logic 54 as packets in the flow are received and processed.

In the pictured example, each entry 60 contains an encryption key 64, to be applied by ALU 56 in processing payload data in the corresponding flow, along with an expected sequence number 66, encryption state parameters 68, and an out-of-order flag 69. Expected sequence number 66 lists the packet sequence number of the next packet that is expected in the flow, for example, the TCP packet sequence number. Control logic 54 increments expected sequence number 66 for each packet that is processed by acceleration logic 40 and, for each new incoming packet, checks the actual packet sequence number against the expected sequence number. When the numbers match (as will usually be the case), control logic 54 passes the packet payload to ALU 56 for processing. Otherwise, these computational operations are skipped, at least until the packet order has been restored. Alternatively or additionally, control logic 54 may apply other predefined conditions in deciding which packets to pass to ALU 56 and which to skip.

ALU 56 reads encryption key 64 and encryption state parameters 68 from table 58 for each packet that the ALU is to process, and updates parameters 68 after processing of the packet is completed. The information included in parameters 68 depends on the algorithm and mode of encryption that are used for each flow. For example, as shown in the table, when cipher block chaining (CBC) is used, parameters 68 may include the last block that was processed, as well as the hash state for purposes of the message authentication code (MAC). Additionally or alternatively, parameters 68 may contain the index used in CCM mode (counter with CBC-MAC) or Galois/counter mode (GCM). Alternatively, table 58 may contain other flow identifiers and other parameters, depending upon the protocols and algorithms that are used in each case.

Out-of-order flag 69 is set to indicate that the packet sequence number of the last packet received in the flow corresponding to entry 60 did not match expected sequence number 66. The use of flag 69 is explained hereinbelow with reference to FIG. 5.

Entries 60 in table 58 may contain additional information, depending on application requirements. For example, entries 60 can also include the details of overlay networking tags that should be matched for a packet to be considered a match to a flow in the table.

As noted earlier, accelerator 26 may be configured to perform computational tasks that are not cryptographic, but do similarly require maintaining a state and handling transport-layer packets, such as compression and/or decompression of packet payloads, or pattern matching, for example by applying certain regular expressions to the payloads. In this case, instead of containing encryption state parameters 68, the flow state table entries could contain the state of the compression or pattern matching mechanism. Other possible uses of accelerator 26 and table include intrusion detection and prevention, storage protocol translation, video and audio codec manipulation (encoding, decoding, recoding, changing quality, etc.), video and audio processing (such as speech-to-text, deep learning applications for object detection, etc.), and deduplication parsing of a data stream.

FIG. 4 is block diagram that schematically illustrates a computer system 70 with a cryptographic accelerator 78, in accordance with another embodiment of the invention. Accelerator 78 is connected through a network switch 82 to a number of host computers 72, 74, 76, . . . , and thus couples the host computers via links 36 and 38 to network 24. Accelerator 78 in this case has a multi-host flow state table 80. In the pictured embodiment, each host computer 72, 74, 76, . . . , has its own NIC 32, which is connected to switch 82 via a respective network link 84. Alternatively, multiple hosts could share the same physical NIC chip, which presents an independent logical NIC to each host, with logical network switching between them. In either case, accelerator 78 performs bump-in-the-wire cryptographic functions (and/or other computations) for flows directed to and from the multiple hosts, rather than being tied to a single host as in the embodiment of FIG. 1.

In an alternative embodiment, switch 82 is connected directly to network 24, instead of or in addition to the connection through accelerator 78. In such an embodiment, packets on network 24 that are to be passed by switch 82 to accelerator 78 can be identified by a VLAN number or overlay network tagging.

The mechanisms described herein assume generally that the host transport layer stack run by CPU 28 is customized to support accelerator 26 or 78. It is possible to support this kind of interaction with only minor modifications to the kernel, for example using a user-space TCP/IP implementation, and steering only the relevant flows and packets to the user application. Each user process uses a different set of 5-tuple end-points and will be allowed to receive and send traffic only in the context of these end points.

It is also possible to share accelerator 26 or 78 between different users and processes. In such a scheme, each process and/or user is allocated a subset of entries 60 in accelerator table 58 that it is allowed to use. NIC (or the operating system kernel) tags the management packets that are used for table updates according to the originating user or process. Control logic 54 checks that the tag matches the allowed tag list for the entry 60 that is indicated by the packet before updating the entry, accepting a loopback packet, or encrypting an outgoing packet.

A mechanism of tagging packets by NIC 32 to facilitate different sorts of processing by accelerator 26 or 78 can be useful for other operations, as well. This tagging can relay to the accelerator information that it does not have, such as identifying the software entity from which the packet originated. The tagging can also provide information about partial processing done by the NIC, such as doing a lookup of the 5-tuple in a NIC-based table. Additionally or alternatively, the tagging can be generated by software running on CPU 28, allowing the software to specify different processing for different packets sent. Use cases for this sort of functionality include, for example, performing packet-by-packet encryption, in which the encryption scheme, key, and/or other details are determined by the tagging provided by the NIC. Another use case example is selecting an encapsulation scheme for overlay networking, based upon the originating virtual machine. Yet another use case is distinguishing long-haul communications, which should be compressed, from local communications that will benefit more from having lower latency and thus are not compressed.

The tagging of packets in connection with functions of accelerator 26 or 78 can be implemented in various ways. One way to do the tagging is using an extra layer-2 header, such as multiple VLAN tags, a CN-Tag, as defined in IEEE specification 802.1Qau, or another, similar Ethertype type-length-value (TLV) structure. Another possible way to do the tagging is to push a Multiprotocol Label Switching (MPLS) header onto the packet, with the accelerator extracting the MPLS header and using it to identify what processing is needed. It is also possible to use layer-3 and layer-4 tagging and/or encapsulation for this purpose, such as GRE/NVGRE/VXLAN encapsulation, modifying the IPv6 flow-ID field, adding an IP header option field, or adding a TCP header option field. Depending on the format of the tagging, accelerator 26 or 78 can either strip the tag from the packet or leave it as non-harmful tag that does not affect packet processing further along the path in network 24.

Methods of Operation

Figure 5:
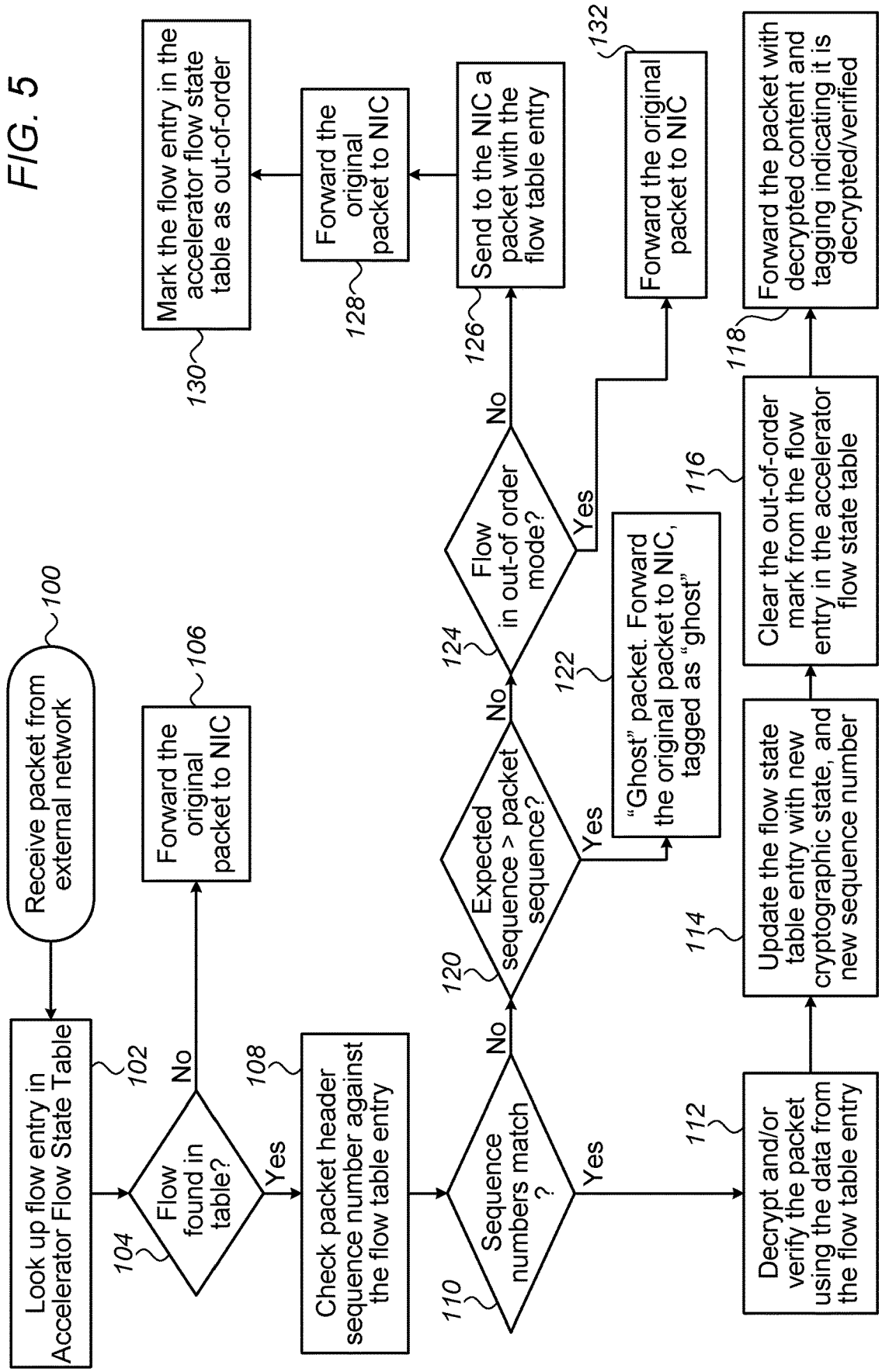
FIG. 5 is a flow chart that schematically illustrates a method for processing of packets received by a cryptographic accelerator from a network, in accordance with an embodiment of the invention.

FIG. 5 is a flow chart that schematically illustrates a method for processing of packets received by accelerator 26 from network 24, in accordance with an embodiment of the invention. Although this processing flow is described, for the sake of clarity, with reference to the elements of system 20 that are shown in FIGS. 1-3, the principles of this embodiment may likewise be implemented, mutatis mutandis, in system 70 (FIG. 4), as well as in other suitable bump-in-the-wire architectures. In addition, as noted earlier, although the present description relates to cryptographic computations performed by accelerator 26, the present techniques may alternatively be applied in offloading other sorts of computations, such as data compression and decompression and pattern matching.

The method of FIG. 5 is initiated upon reception of a packet from network 24 at interface 50, in a packet reception step 100. Control logic 54 attempts to look up the packet in flow state table 58, according to the contents of the packet (for example, in TCP/IP flows, using the 5-tuple from the packet), at a lookup step 102. If control logic 54 finds, at a flow identification step 104, that the packet does not match any entry 60 corresponding to a known flow that has been loaded into table 58 by CPU 28, the control logic forwards the original packet to NIC 32 via interface 52, at a packet forwarding step 106. NIC 32 passes the packet to CPU 28, which handles the packet in accordance with its normal software processing flow.

If the packet is found at step 104 to belong to a flow with a corresponding entry 60 in table 58, control logic 54 compares the sequence number in the packet header to expected sequence number 66 stored in the table, at a sequence number comparison step 108. In most cases, the sequence number of the packet will be found to match exactly the expected next sequence number in the flow to which it belongs, at a number matching step 110. In this case, control logic 54 instructs ALU 56 to perform the required cryptographic actions on the content of the packet payload, at a payload processing step 112. For incoming packets, these cryptographic actions typically include, for example, decrypting the packet payload using the appropriate key 64 from entry 60, such as the session key or public key, and/or verifying cryptographic signatures of the packets, using cryptographic algorithms and computational methods that are known in the art.

At this stage, control logic 54 also updates entry 60 in state table 58, with both transport and cryptographic parameters, at a table update step 114. This step includes incrementing expected sequence number 66. If entry 60 has been marked as an out-of-order flow, meaning that flag 69 is set, control logic 54 clears the out-of-order mark, at a state update step 116. (When the flow state is changed in this manner, CPU 28 will not be aware of the change in the flow state. Control logic 54 will forward the new state to CPU 28 upon reception of the next out-of-order packet.) Finally control logic 54 forwards the decrypted and/or verified packet contents to NIC 32, at a payload forwarding step 118.

Control logic 54 may mark the packets forwarded at step 118 as "decrypted" or "verified" or, if more information is needed to complete verification of the data, control logic 54 may mark the forwarded packet as "data still not verified." Alternatively, control logic 54 may tag forwarded packets in an "inverse" manner, such that only packets that are forwarded in their original format are marked, while decrypted and verified packets are not tagged. In either case, control logic 54 can mark the packets by setting a certain field in the Ethernet or IP header, for example.

Returning now to FIG. 5, if the packet sequence number does not match expected sequence number 66 at step 110, control logic 54 checks whether the packet serial number is in the current TCP receive window, or whether it is an unneeded retransmission (referred to as a "ghost" packet), at a window checking step 120. This check is typically performed in accordance with IETF RFC 793 for TCP transport, or in another manner that is appropriate for the actual transport protocol in use. For example, in TCP, if the packet sequence number is less than expected sequence number 66, control logic 54 will identify it as a ghost packet. In this case, control logic 54 forwards the packet via NIC 32 to CPU 28 for handling by the software stack, at a ghost forwarding step 122. Typically at step 122, control logic 54 will tag the packet at a ghost packet and will not change the corresponding entry 60 in table 58.

If control logic 54 finds at step 120 that the packet is simply out of order (not a ghost packet), the control logic checks whether flag 69 is already set in entry 60 to indicate that this is an out-of-order flow, at a flow state checking step 124. If flag 69 is not already set, control logic 54 sends a special packet via interface 52 to NIC 32, containing the flow state data, at a flow state forwarding step 126. This packet contains the information from entry 60 for this flow, as well as an indication that the latest packet was received out of order. Control logic 54 then forwards to NIC 32, via interface 52, the original packet as received from network 24, at a packet forwarding step 128. Finally, to avoid sending the same flow state packet repeatedly, the accelerator marks the flow state entry as being in "out-of-order" mode by setting flag 69, at a state marking step 130.

Thus, if control logic 54 finds at step 124 that flag is set in entry 60, it will conclude that the corresponding flow is already in out-of-order mode. In this case, control logic 54 simply forwards the packet via interface 52 to NIC 32, at a packet forwarding step 132, similar to step 128, without re-sending the flow table entry as it did at step 126.

Figure 6:
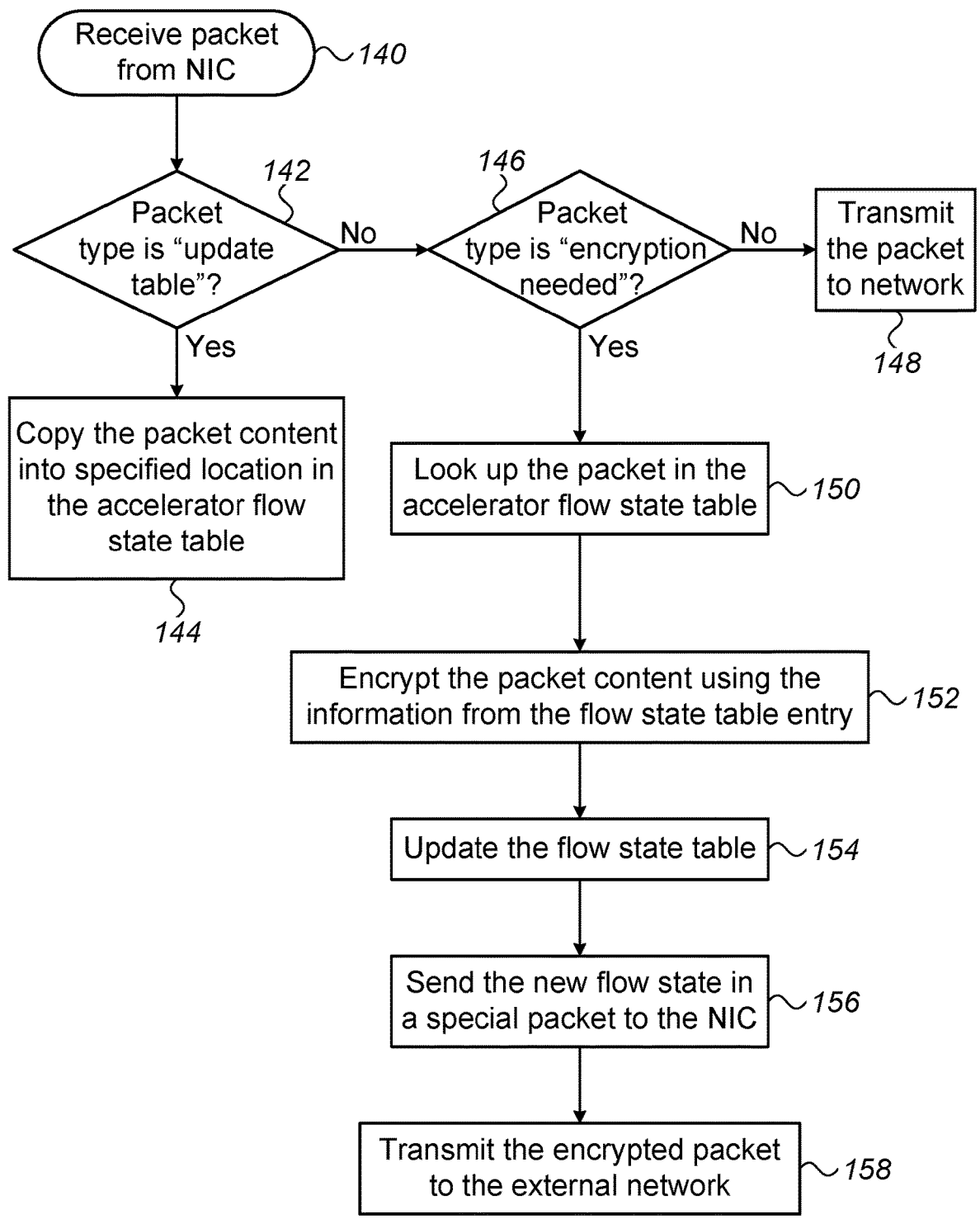
FIG. 6 is a flow chart that schematically illustrates a method for processing of packets received by a cryptographic accelerator from a host computer, in accordance with an embodiment of the invention.

FIG. 6 is a flow chart that schematically illustrates a method for processing of packets received by accelerator 26 from NIC 32 for transmission to network 24, in accordance with an embodiment of the invention. The provisos enumerated above with respect to the generality of the method of FIG. 5 apply to FIG. 6, as well.

The method of FIG. 6 is initiated when accelerator 26 receives an outgoing packet from NIC 32 via interface 52, at a packet input step 140. NIC 32 typically tags outgoing packets, using special VLAN tags, VXLAN encapsulation, or Ethertypes, to mark packets for handling by accelerator 26. Control logic 54 checks the appropriate tag to determine whether special handling is needed, at a packet type checking step 142.

If the packet type specified by the tag indicates that the packet contains an update to flow state table 58, control logic 54 uses the packet payload to update one or more table entries 60, at a table update step 144. For example, control logic can update an entry in the table simply by copying the contents of the packet to a location in memory 42 at an offset specified in the packet. Alternatively, the packet may contain other instructions, for example, "XOR this value with the existing entry value."

(In some cases, accelerator 26 and CPU 28 might enter the following negative cycle, which combines elements of the transmit flow of FIG. 6 with the receive flow of FIG. 5: CPU 28 tries to offload the decryption of a certain stream to accelerator 26 by sending an update packet to the accelerator, but this update reaches the accelerator at step 144 too late, after it has already forwarded previous encrypted packets in the same flow to CPU 28 at step 106 (FIG. 5). The next packet received from network 24 will then be found to be out of order by control logic 54 at step 110, leading it to disable the relevant entry 60 at step 130. CPU 28 will now have to offload the flow again to accelerator 26. To avoid this sort of cycle, CPU 28 can use transport-level primitives transmitted over network 24 by NIC 32, such as closing the receive window of the TCP/IP stack, to force a quiet period in the communication flow in question from the remote host until the update to table 58 has been completed.)

Returning now to FIG. 6, if control logic 54 finds at step 142 that the packet type indicates that the packet is to be transmitted to network 24, it checks further to determine whether encryption of the packet payload is required, at an encryption checking step 146. If the packet is not tagged as requiring treatment by accelerator 26, control logic 54 simply forwards the packet unmodified via interface 50 to network 24, at a packet forwarding step 148.

If control logic 54 finds at step 146 that the packet contents are to be encrypted, it fetches entry 60 from table 58 for the flow to which this packet belongs, based on flow identifier 62, at a flow lookup step 150. This entry is guaranteed to exist, as CPU 28 controls the table contents and can ensure that any updates needed in table 58 are made before the packet is transmitted. In other words, CPU 28 will not tag a packet as requiring encryption without first ensuring that the required entry 60 exists in table 58. Using the information from entry 60, ALU 56 performs the appropriate cryptographic operations on the packet payload, such as encrypting the payload using an appropriate private key or session key and/or computing a digital signature to append to the payload, at an encryption step 152.

Following this cryptographic operation, control logic 54 updates the corresponding entry 60 in flow state table 58 to reflect the state reported by ALU 56, at a table update step 154. Control logic 54 mirrors this state change to CPU 28, for example by sending a special packet via interface 52 to NIC 32, at a host mirroring step 156. Control logic 54 then transmits the packet, with its encrypted payload, via interface 50 to network 24, at a packet transmission step 158.

The purpose of mirroring step 156 is to enable CPU 28 to retransmit the relevant packet in case of loss, for example in response to a TCP NACK from the node to which the flow in question is directed. If a retransmission is needed, the CPU sends an "update table" packet to accelerator 26, which causes control logic 54 (at step 144) to roll the state of the corresponding entry 60 in table 58 back to the state it had before transmitting the packet that was lost. Following this update, CPU 28 simply retransmits the unencrypted packets from the point at which the loss occurred, with the "encryption needed" tag set on the packets. Accelerator 26 will then encrypt the packets, using the same logic as it used for the original transmission. Alternatively, at step 156, control logic 54 may mirror the actual encrypted packet to CPU 28, instead of or in addition to sending the table update, and will thus enable the CPU to retransmit packets when necessary without the need for re-encrypting the payload.

Although step 156 is shown in FIG. 6 as being carried out every time a packet is transmitted by accelerator 26, in an alternative embodiment the accelerator sends these flow state updates back to the NIC only intermittently.

Figure 7:
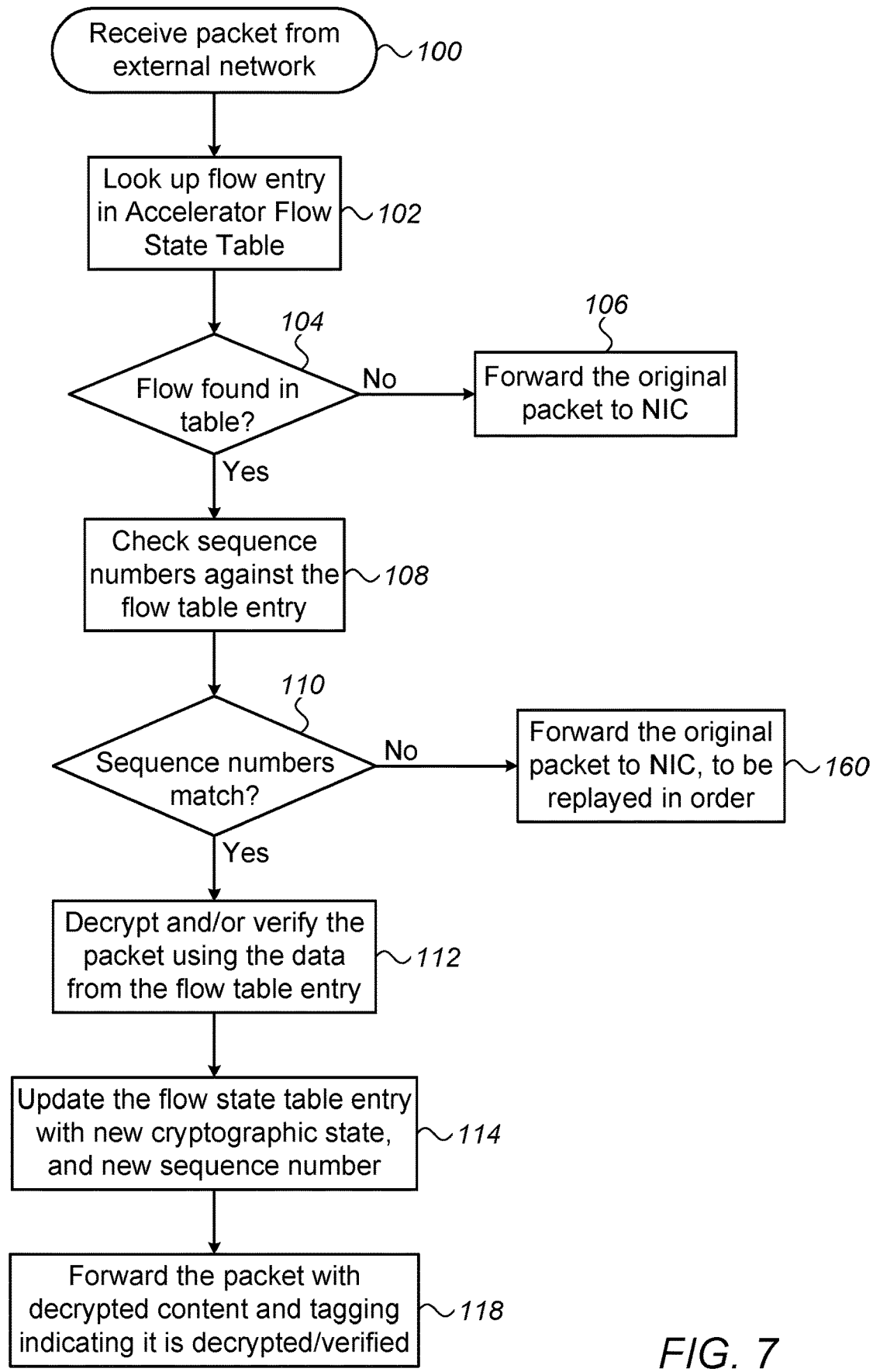
FIG. 7 is a flow chart that schematically illustrates a method for processing of packets received by a cryptographic accelerator from a network, in accordance with an alternative embodiment of the invention.
Figure 8:
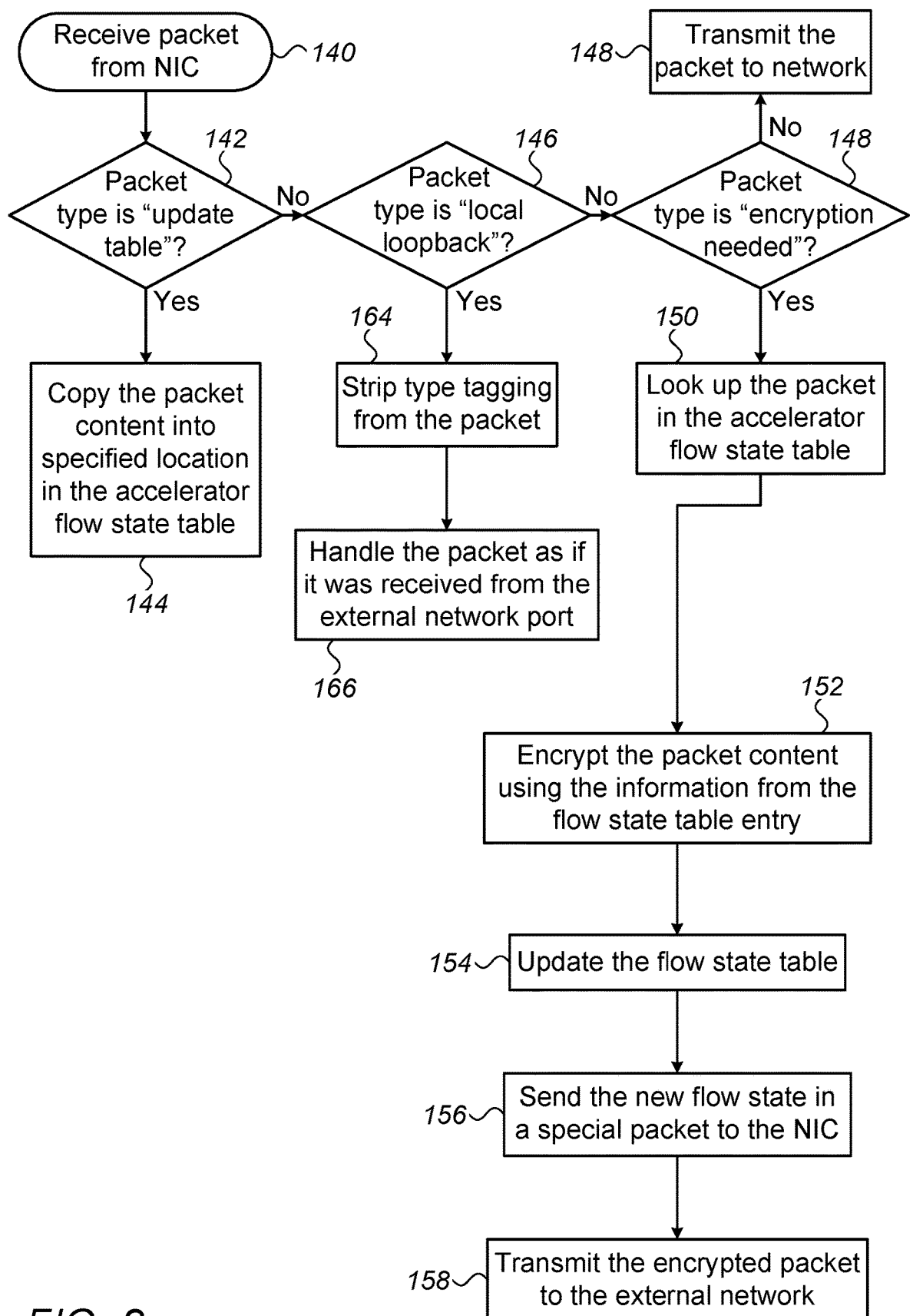
FIG. 8 is a flow chart that schematically illustrates a method for processing of packets received by a cryptographic accelerator from a host computer, in accordance with an alternative embodiment of the invention.

FIGS. 7 and 8 are flow charts that schematically illustrate methods for processing of packets received by accelerator 26 from network 24 and from NIC 32, respectively, in accordance with an alternative embodiment of the invention. These methods are similar in most respects to the methods of FIGS. 5 and 6, and steps that are carried out in similar fashion to the steps in FIGS. 5 and 6 are labeled with the same numbers in FIGS. 7 and 8. The methods of FIGS. 7 and 8 differ from the preceding methods, however, in that when the accelerator receives packets out of order, it relies on the host processor to reorder the packets and feed them back to accelerator in the proper order. For the sake of brevity, the following description of FIGS. 7 and 8 will relate mainly to the differences between the present embodiment and that described above.

In the method of FIG. 7, when accelerator 26 is unable to process a given packet received from network 24, either because the relevant flow is not found in table 58 at step 104, or the sequence number of the packet does not match expected sequence number 66 at step 110, control logic 54 forwards the packet to NIC 32 without decryption via host interface 52, at packet forwarding step 106 or step 160, respectively. The packets are then held in a memory, such as CPU memory 30, and are subsequently "replayed" by CPU 28 through accelerator 26 once table 58 has been updated and all necessary packets have been received in order, as noted in step 160. The replayed packets are tagged as such by CPU 28 or NIC 32, and are handled by accelerator 26 as though they had been received from network 24, even though they are received through host interface 52 (as illustrated in FIG. 8). This replay tagging can be implicit, i.e., control logic 54 checks all packets against flow state table 58, and ALU 56 decrypts the packets in the same manner regardless of the interface from which they were received.

Thus, in the method of FIG. 7, upon receiving a packet from network 24 at step 100 and looking up the flow in table 58 at step 102, if no entry 60 for the flow is found at step 104, control logic 54 forwards the packet to CPU 28 via NIC 32 at step 106, and relies on CPU 28 to replay it after updating table 58. If a matching entry 60 is found in flow state table 58, control logic 54 checks the packet sequence number against expected sequence number 66 at step 108, and in the event a mismatch is found at step 110, forwards the packet to NIC 32 at step 160, for subsequent replay.

Otherwise, when the packet sequence numbers match at step 110, ALU 56 performs the required decryption and/or verification at step 112. Control logic 54 updates table 58 at step 114, and then forwards the decrypted packet to NIC 32 at step 118.

In an alternative implementation of these replay methods, control logic 54 caches the packets that are expected to be replayed in memory 42. In this case, to replay a given packet or packets, CPU 28 passes a descriptor to accelerator 26 that identifies the cached packets in memory 42. In this sort of implementation, control logic 54 need forward only the packet header and descriptor to NIC 32 at step 160, rather than the entire packet.

In the transmission flow shown in FIG. 8, upon receiving a packet from NIC 32 at step 140, control logic 54 checks whether the packet contains an update to flow state table 58 at step 142, and if so updates the table accordingly at step 144. Control logic 54 next checks whether the packet has a local loopback tag, at a loopback checking step 162. As explained above, this tag constitutes an instruction to control logic 54 that this packet was received previously from network 24 and is now to be replayed. If so, control logic 54 strips the tag from the packet, at a tag stripping step 164, and passes the packet payload to ALU 56 for decryption. ALU 56 performs the appropriate decryption and/or verification operations, as though the packet had been received from the network directly, at a computation step 166. Control logic 54 then returns the decrypted packet to NIC 32.

For all other packets received from NIC 32, control logic 54 checks whether an encryption operation is needed at step 146, and if not, passes the packet through to NIC 32 at step 148. If encryption is needed, control logic 54 proceeds with flow table lookup at step 150, followed by encryption by ALU at step 152, flow table update at step 154, mirroring the flow state to CPU 28 at step 156 and packet transmission at step 158.

Control logic 54 may implement further variations on and additions to the methods presented above. As one example, control logic 54 can independently handle certain aspects of the encryption control plan. Assuming the traffic is received in order from network 24, the control logic can handle requests to change the cipher (such as the ChangeCipher-Spec message in SSL and TLS) internally, and either completely hide these messages from CPU 28, or mark them as "transparently handled" before passing them to the CPU.

As another example, control logic 54 could queue a reply message to be sent back over network 24 to the sender of a given packet by passing the packet to NIC 32, tagged as "loopback as part of the flow." This tag will cause CPU 28 to loop the packet back. Such a packet can also contain a request to update relevant parameters, so that accelerator 26 will switch the encryption mode only once the proper signaling is sent back.

Alternative Embodiments

Figure 9:
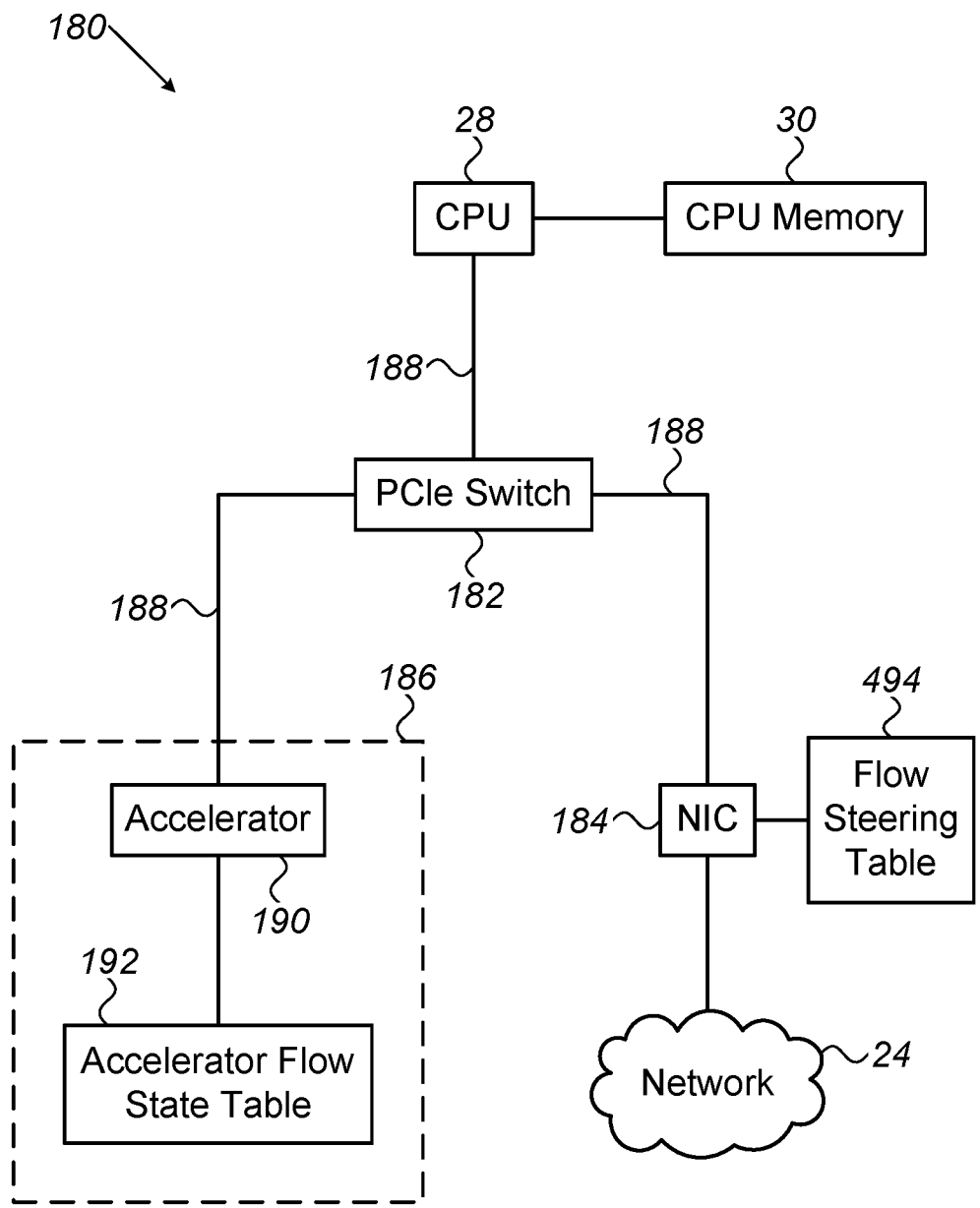
FIG. 9 is block diagram that schematically illustrates a computer system with a cryptographic accelerator, in accordance with another embodiment of the invention.

FIG. 9 is block diagram that schematically illustrates a computer system 180 with a cryptographic accelerator 186, in accordance with another embodiment of the invention. In this embodiment, instead of being deployed as bump on the wire, accelerator 186 is connected to CPU 28 and to a NIC 184 by a host bus 188, such as a PCIe bus, with a PCIe switch 182 connecting the elements of system 180 as is known in the art.

Upon receiving packets from network 24, NIC 184 checks the packet flow identifiers against a flow steering table 194. When the corresponding entry in table 194 indicates that the packet is to be handled by accelerator 186, NIC 184 transfers the packet over bus 188 to the accelerator. Acceleration logic 190 in accelerator 186 processes the packets using information in a flow state table 192. After decrypting and/or verifying the packet payloads, accelerator 186 forwards the data over bus 188 to CPU 28, independently of NIC 184, and updates table 192 as appropriate. The flow matching decisions made by NIC 184 regarding whether to steer a given packet to accelerator 186 can also include checking the packet sequence number, so that only packets that match the expected sequence number in flow steering table 194 are forwarded to the accelerator. NIC 184 updates the expected sequence number in table 194 with each packet steered to the accelerator.

For data transmission, CPU 28 can provide the data to be encrypted to accelerator 186, which then returns the encrypted data via bus 186. For example, accelerator 186 may expose the encrypted data on a bus interface that is addressable via memory-mapped input/output (MMIO) on bus 186, such as its PCIe base address register (BAR) space. CPU 28 can then instruct NIC 184 to fetch the packet content from this area, while providing the packet headers.

In the configuration shown in FIG. 9, steps 126 and 128 in FIG. 5 can be skipped. Instead, CPU 28 can explicitly read and possibly delete the relevant entry in flow state table 192 using a specialized interface, such as the MMIO PCIe interface or via a "magic" packet sent over bus 188, for example.

In another embodiment, the configuration shown in FIG. 9 can be used in handling processing requests from other entities on network 24, to be executed by accelerator 186. The entire incoming packet from the network, containing data for processing, is steered by NIC 184 to accelerator 186. Upon packet reception, the acceleration logic 190 performs the following steps:

1. Verifies the various transport-related checksums. If the checksums are invalid, the packet is forwarded as-is to CPU 28, or dropped (depending upon configurable policy). Otherwise, the following steps are done:
2. Acceleration logic 190 writes a copy of the packet contents to the memory of accelerator 186 (such as memory 42 shown in the preceding figures).
3. Forwards the packet headers to host software running on CPU 28, while replacing the contents of the packet with a descriptor. The descriptor points to the copy of the packet content that the accelerator saved in step 2.

Based upon the information from step 3, the host driver software feeds the transport layer stack with packets that are built based upon the forwarded packet headers. Instead of the original content, each packet contains a descriptor (size and pointer), followed by zeros to pad the packet to the original size. The transport layer logic running on CPU 28 rearranges the packets, generating a logical flow of data. The content of this flow is a list of descriptors, with padding zeros between them. The host driver software can now read this logical flow and extract the ordered list of descriptors to recompose the flow. The software feeds the compacted list of descriptors (without the padding) to accelerator 186, which processes the data according to the order indicated by the list.

As the transport layer state is managed completely by the host software, all retransmission requests, reordering and congestion control signaling are done by the transport layer stack on CPU 28, and acceleration logic 190 does not need to be aware of it.

For data transmission, a similar mechanism can be used. When accelerator 186 has data ready for transmission, the host driver software (or another software component) queues dummy data to be transmitted by the transport layer software running on CPU 28. The transport layer software generates packet descriptors that contains headers together with pointers to the dummy data, and relays them to the driver software. The driver software strips the dummy data from the packets and replaces the dummy data with descriptors indicating the data location and size in the memory of accelerator 186 that were previously reported by the accelerator.

Alternatively, if the TCP stack does not perform zero-copy processing of the dummy data, the driver can use the packet sequence numbers and a table lookup, for example, to figure out where the data are located (while ignoring the actual transmitted data). It is also possible to handle this sort of situation by including special marking in the data, so that the data themselves point to the relevant buffers (e.g., each 32-bit word in the dummy data contains its offset in the stream), or by passing metadata from the transport layer to the network driver.

When acceleration logic 190 receives from the host software a packet of this sort for transmission, it fills in the content of the packet according to the descriptors provided by the driver software. The acceleration logic recomputes the checksums of the packet, and transmits it to network 24 via NIC 184. Identifying the packet as a packet that accelerator 186 should handle (as opposed to packets that should be transparently forwarded to network 24 or from network 24 to PCU 28) can be done using a field that already exists in the packet, such as the MAC address, VLAN tag, IP address or TCP port, or combinations of these fields. It is also possible for CPU 28 to send the packet with a special encapsulation tag to identify it as a packet that requires special handling.

In another alternative embodiment (not shown in the figures), the accelerator is integrated as part of the NIC, performing the acceleration as part of the packet processing in the NIC. In such cases, instead of sending packets to the NIC, the accelerator logic can use a different mechanism, such as PCIe direct memory access (DMA) operations, to communicate the state and/or data to and from the host CPU.

In such embodiments, control logic 54 may undertake additional data handling and protocol offload functions. For example, instead of forwarding the entire packet to NIC 32 at step 118 (FIGS. 5 and 7), control logic 54 may forward only the relevant data to CPU 28. In one such implementation, control logic 54 writes only the decrypted payload data to a designated memory buffer in CPU memory 30, while forwarding transport-related information (such as flow identity and current sequence number) to a different buffer, to be handled by transport layer logic.

Additionally or alternatively, following step 118, control logic 54 can send an explicit end-to-end, transport-layer acknowledgment packet (such as a TCP ACK) to network 24. This approach reduces the latency of processing data in the accelerator. The end-to-end packet can also relay information about the congestion situation, for example by reflecting the explicit congestion notification (ECN) marking in the IP headers of the received packets. Such preemptive acknowledgement and/or congestion condition reporting by the accelerator hardware can be useful even when there is no other acceleration functionality applied to a given packet.

Further additionally or alternatively, instead of using a special packet type to update flow state table 58 at step 144, CPU 28 could use a dedicated interface for table updates, by an MMIO register access for example. Alternatively, the CPU 28 can write an entry in a table or log in CPU memory 30, to be fetched by control logic 54 when needed. For example, when a given flow is not found in table 58 at step 104 (FIG. 5), control logic 54 will first attempt to fetch the updates to the table from CPU memory 30 by DMA, before declaring the flow to be not found.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Data processing apparatus, comprising:
 a host processor, configured with a transport layer stack which processes received packets;
 a network interface controller (NIC), which is configured to couple the host processor to a packet data network;
 a memory, configured to hold a flow state table containing context information with respect to computational operations to be performed on multiple packet flows conveyed between the host processor and the network; and
 acceleration logic, which is coupled to the host processor through a host bus, a network switch or a network link, and is configured to perform the computational operations on payloads of packets in the multiple packet flows using the context information in the flow state table,
 wherein the NIC is configured to steer incoming packets from the packet data network to the acceleration logic,
 wherein the acceleration logic is configured to store payloads of the incoming packets in a temporary buffer, to forward headers of the incoming packets to the host, through the host bus, the network switch or the network link, for processing by the transport layer stack in the host processor and to perform the computational operations on the stored payloads of packets, responsively to results of the processing by the transport layer stack provided to the acceleration logic,
 wherein the host processor is configured to feed the transport layer stack with packets formed of the forwarded headers and padding to the original sizes of the packets.

2. The apparatus according to claim 1, wherein the acceleration logic and the memory are comprised in an acceleration device, which is coupled between the NIC and the packet data network.

3. The apparatus according to claim 2, and comprising a switch, which is coupled between the NIC and the acceleration device and is configured to be coupled to communicate with multiple host processors, wherein the flow state table contains context information with respect to the packet flows conveyed via the acceleration device to and from the multiple host processors.

4. The apparatus according to claim 1, wherein the acceleration logic is coupled to the host processor and the NIC via a host bus, and wherein the NIC is configured to steer the packets received from the packet data network in the multiple packet flows via the host bus to the acceleration logic for performance of the computation operations thereon.

5. The apparatus according to claim 1, wherein at least one of the host processor and the NIC is configured to apply tags to the packets for transmission to the packet data network, wherein the tags are indicative of the computational operations to be performed by the acceleration logic, and wherein the acceleration logic is configured to decide on the computational operations to be applied to each of the packets that it receives from the NIC responsively to the tags.

6. The apparatus according to claim 1, wherein the computational operations performed by the acceleration logic comprise cryptographic computations, and wherein the context information comprises cryptographic parameters.

7. The apparatus according to claim 1, wherein the flow state table indicates for the flows a current sequence number and wherein the acceleration logic is configured to determine whether packets received from the network have a sequence number matching the current sequence number of the flow of the packet in the flow state table, and to perform the computational operations only on packets for which the packet sequence number matches the current sequence number in the flow state table.

8. The apparatus according to claim 7, wherein the acceleration logic is configured to pass to the host processor packets for which the packet sequence number does not match the current sequence number in the corresponding flow state table, without performing the computational operations.

9. The apparatus according to claim 8, wherein the acceleration logic is configured, in response to detecting a packet received from the network for which the packet sequence number does not match the corresponding current sequence number of the flow of the packet in the flow state table, to pass to the host processor the corresponding context information for the packet from the flow state table.

10. The apparatus according to claim 8, wherein the host processor is configured to reorder packets passed from the acceleration logic without performing the computational operations, and to return the reordered packets to the acceleration logic for performing the computational operations.

11. The apparatus according to claim 1, wherein the host processor is configured to pass to the acceleration logic, for packets processed by the transport layer stack, a descriptor identifying the packet, and wherein the acceleration logic is configured perform the computational operations responsively to the passed descriptor.

12. The apparatus according to claim 1, wherein the acceleration logic is configured to forward the headers of the incoming packets with descriptors pointing to the stored payload.

13. The apparatus according to claim 1, wherein the acceleration logic is configured to forward headers of the incoming packets to the host through a network switch.

14. The apparatus according to claim 1, wherein the acceleration logic is configured to forward headers of the incoming packets to the host through a host bus.

15. The apparatus according to claim 1, wherein the acceleration logic is configured to forward headers of the incoming packets to the host through a network link.

16. A method for data processing, comprising:
coupling a computational accelerator to communicate with a host processor through a host bus, a network switch or a network link, wherein the host processor is coupled to transmit and receive data packets to and from a packet data network, wherein the host processor is configured with a transport layer stack which processes received packets;
storing in a memory a flow state table containing context information with respect to computational operations to be performed by the computational accelerator on multiple packet flows conveyed between the host processor and the packet data network;
steering incoming packets from the packet data network to the computational accelerator;
storing payloads of the incoming packets in a temporary buffer, by the computational accelerator;
forwarding headers of the incoming packets from the computational accelerator to the host through the host bus, the network switch or the network link, for processing by the transport layer stack in the host processor;
feeding the transport layer stack with packets formed of the forwarded headers and padding to the original sizes of the packets; and
performing, by the computational accelerator, the computational operations on the stored payloads of packets, responsively to results of the processing by the transport layer stack in the host processor, provided to the computational accelerator.

17. The method according to claim 16, wherein the host processor is coupled to transmit and receive the data packets via a network interface controller (NIC), and wherein the computational accelerator is coupled between the NIC and the packet data network.

18. The method according to claim 17, wherein coupling the computational accelerator comprises configuring the computational accelerator to communicate via a switch with multiple host processors, wherein the flow state table contains context information with respect to the packet flows conveyed via the computational accelerator to and from the multiple host processors.

19. The method according to claim 16, and comprising applying tags to the packets for transmission from the host processor to the packet data network, wherein the tags are indicative of the computational operations to be performed by the acceleration logic, and wherein performing the computational operations comprises deciding, in the computational accelerator, on the computational operations to be applied to each of the packets that it receives for transmission to the data network responsively to the tags.

20. The method according to claim 16, wherein the computational accelerator is coupled via a host bus to the host processor and to a network interface controller (NIC), which couples the host processor packet data to the packet data network, and wherein the method comprises steering the packets received from the packet data network in the multiple packet flows by the NIC via the host bus to the accelerator for performance of the computation operations thereon.

21. The method according to claim 20, wherein the method further comprises passing copies of the steered packets from the computational accelerator to the host processor for transport-layer processing of headers of the packets, while replacing the payloads of the copies of the steered packets with descriptors indicating respective locations of the payloads in the memory, and wherein performing the computational operations comprises issuing instructions from the host processor to the computational accelerator with respect to the computational operations using the descriptors.

22. Data processing apparatus, comprising:

a host processor;

a network interface controller (NIC), which is configured to couple the host processor to a packet data network;

a memory, configured to hold a flow state table containing context information with respect to computational operations to be performed on multiple packet flows conveyed between the host processor and the network, wherein the flow state table indicates for the flows a current sequence number; and acceleration logic, which is coupled to perform the computational operations on payloads of packets in the multiple packet flows using the context information in the flow state table, wherein the acceleration logic is configured to determine whether packets received from the network have a sequence number matching the current sequence number of the flow of the packet in the flow state table, and to perform the computational operations only on packets for which the packet sequence number matches the current sequence number in the flow state table, wherein the acceleration logic is configured to pass to the host processor packets for which the packet sequence number does not match the current sequence number in the corresponding flow state table, without performing the computational operations, wherein the acceleration logic is configured, in response to detecting a packet received from the network for which the packet sequence number does not match the corresponding current sequence number of the flow of the packet in the flow state table, to pass to the host processor the corresponding context information for the packet from the flow state table, and wherein the acceleration logic is configured, in response to detecting a packet received from the network for which the packet sequence number does not match the corresponding current sequence number of the flow of the packet in the flow state table, to set a flag in the flow state table indicating the corresponding flow is out-of-order, and wherein the acceleration logic is configured to pass to the host processor the corresponding context information, only when the out-of-order flag was not set when the packet was received.

* * * * *